Sept. 11, 1962  J. E. DAUNT ET AL  3,053,694
ABRADABLE MATERIAL
Filed Feb. 20, 1961

INVENTORS.
JOHN E. DAUNT
MAX F. GRANDEY
BY
Lee H. Sachs
ATTORNEY

United States Patent Office 3,053,694
Patented Sept. 11, 1962

3,053,694
ABRADABLE MATERIAL
John E. Daunt, Fort Thomas, Ky., and Max F. Grandey, Hamilton, Ohio., assignors to General Electric Company, a corporation of New York
Filed Feb. 20, 1961, Ser. No. 90,495
11 Claims. (Cl. 117—95)

The present invention relates to abradable materials and more particularly relates to relatively porous high temperature operating abradable materials including boron nitride.

More specifically, the present invention is concerned with new and improved compositions particularly useful as sealing surfaces between relatively moving parts of compressors, and as thermal insulators as well as with the methods for the production of these compositions.

In the art of gas turbine compressors, such as those for example of the axial flow type having a rotor with a plurality of circumferentially disposed, radially extending blades, and a casing surrounding the rotor having an inner surface closely spaced with the free ends of the rotor blades, it is well known that the efficiency of the compressor is dependent in part upon the dimensional tolerances that are maintained during the production of the compressor assembly. A particularly difficult dimensional tolerance to maintain is concerned with the peripheral seal between the free ends of the rotor blades and the surrounding casing. The use of abradable sealing materials as a lining for the casings is well known in the art. Such materials have been used to avoid damage due to the contact of the rotor blades with the compressor casing and further to effect the necessary seal between the relatively moving parts is well known in the art, however.

In British Patent 791,568, for example, the use of a thermosetting resin as a compressor sealing or lining material is suggested. U.S. Patents 2,742,224, 2,840,343 and 2,930,521, on the other hand, teach the use of metals such as cadmium, lead, zinc, aluminum-magnesium, aluminum-copper and nickel as abradable materials for use as seals in compressor assemblies. Additionally, British Patent 793,886 suggests the provision of a yielding cellular construction, such as a honeycomb assembly adapted to occupy the space between the rotor blades and the compressor casing wall which thus acts as a sealing means between the relatively moving parts. The use of a filler material to fill the honeycomb assembly is also disclosed in the latter patent.

Unfortunately, however, the materials and methods heretofore employed in the prior art are unsatisfactory in providing a suitable abradable seal material capable of use in the new, high Mach turbojet engines currently manufactured. Specifically, the extremely high temperatures attained during the operation of these new high Mach turbojet engines prevent the use of resinous as well as some metallic or metallic compound compositions due to the decomposition of the resins and the relatively low melting points of some of the metals. Other metals or metallic compounds, although having sufficiently high melting points, become oxidized at the high temperatures attained during the operation of such turbojet engines. Such oxidation can cause breakdown and destruction of the material itself and can seriously interfere with successful operation of some engine components. Still other metals become hardened, and thereby cause excessive rotor blade damage.

It has become apparent that the relatively thin sheet metal compressor casings proposed for the new high Mach turbojet engines are difficult to manufacture within the concentricity tolerances which would be necessary to effectuate an adequate seal without the use of an abradable coating or lining on the compressor casing interior walls. Accordingly, it became evident that an abradable seal material capable of functioning at temperatures of the order of 1300° F. or more was important for the successful operation of the new high Mach turbojet engines. Such a material, however, would of necessity have to possess excellent adhesion to metal and remain stable, i.e., unaffected over a temperature range of from −100° F. to +1300° F. Yet it would have to include the proper type of solid lubricity to afford ready abradability. Further, such a material would have to be capable of being easily repaired or patched in situ after engine operation, i.e., after being subjected to an operating rub at the high temperatures attained during engine operation. Moreover, and most importantly perhaps, the material would necessarily have to be of such a nature as to be capable of passing through the engine (after being abraded off the compressor wall) without deleteriously affecting the successful operation of the engine in any way.

Accordingly, the primary object of the present invention is to provide a new and improved abradable material which can be effectively used at the high temperatures attained during the operation of a high Mach turbojet engine.

Another object of the present invention is to provide a new and improved method for producing an improved abradable material capable of use at temperatures of the order of 1300° F. or above.

A further object of the present invention is to provide a new and improved abradable seal material for use in high Mach turbojet engines which will form an excellent bond with metal at temperatures ranging from −100° F. to about +1300° F.

Still another object of the present invention is to provide a new and improved abradable seal material for use in high Mach turbojet engines which can be easily repaired in situ after being subjected to operating abrasion at the high temperatures attained during the high Mach turbojet engine operation.

Briefly stated, these and other objects which will appear hereinafter are attained in accordance with one form of the present invention by admixing, by weight, 3–27% boron nitride, 42–53% of an aqueous solution of sodium silicate, and 3–35% of at least one member selected from the group consisting of mica and vermiculite, and drying and curing the resulting mixture to form an abradable material capable of operating at temperatures of the order of 1300° F. or above. In another form, the above admixture includes, by weight, 32–43% silver, 3–6% boron nitride, 42–53% sodium silicate aqueous solution (40–42° Baumé) and either or both of mica and vermiculite used in the respective portions of 3–6% mica and 10–17% vermiculite.

Still other objects and advantages will be apparent from the following detailed description and claims, and from the accompanying drawing which illustrates an embodiment of the invention and in which:

Figure 1:
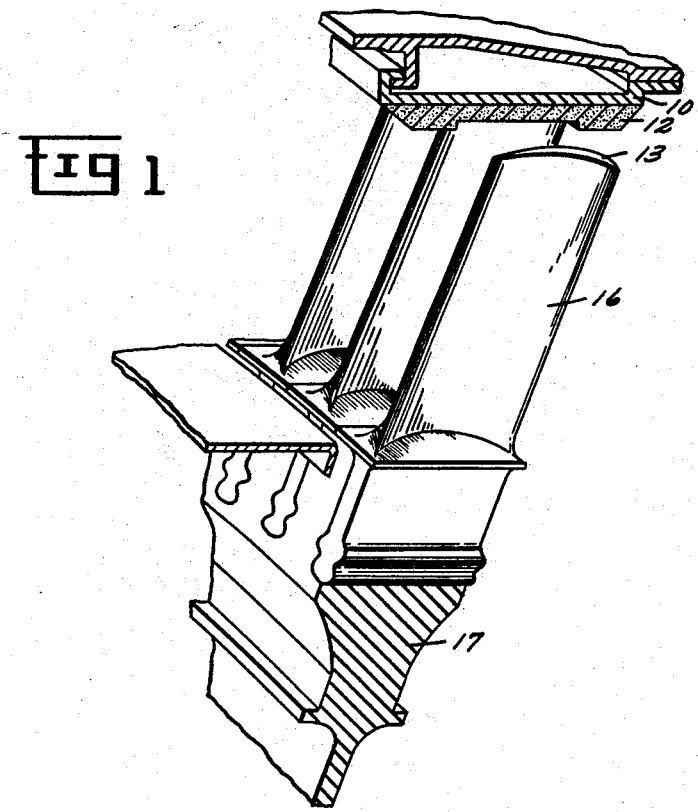
FIGURE 1 is a fragmentary perspective sectional view of a compressor section of a high Mach turbojet embodying the present invention.

Referring now more particularly to the drawing, FIGURE 1 illustrates a compressor casing 10, provided with a layer or interior lining of the new and improved abradable material 12 of the present invention which can be machined by the tip 13 of compressor blade 16 to establish a minimum working clearance between the blade tip and the opposing material, thus to provide an effective seal between the blades and the wall of the compressor casing.

Figure 2:
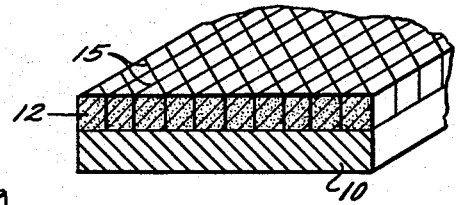
FIGURE 2 is a perspective sectional view of a honeycomb structure which may be used in accordance with the present invention.

The honeycomb structure shown in FIGURE 2 is preferably metallic. A variety of metals may be used depending, of course, upon the specific requirements of a particular installation. Stainless steel, such as A.I.S.I. type 321, and nickel or nickel-cobalt base alloys, such as the 15 Cr, 2 Ti, 7 Fe, balance Ni and/or Co, have for example, been successfully employed. The thickness of the metal forming the honeycomb assembly may vary within a wide range with thicknesses from less than 0.001 inch to greater than 0.01 inch having been used. Since the honeycomb material comprises a metal or metal alloy in most cases, it has been found advisable to maintain the thickness of the honeycomb wall at a minimum so as to inhibit blade tip wear. In a preferred embodiment of the present invention, a honeycomb having a cell size of ¼ inch and a cell wall thickness of about 0.002 inch, was utilized. It should be understood, on the other hand, that as the size of the cell units as well as the mass of the members involved increases, greater thicknesses may be successfully utilized. It is further emphasized that although the honeycomb structure of FIGURE 2 is illustrated as having rectangular sections, other configurations may be employed. The term "honeycomb" hereinafter referred to will be used to describe all cell configurations and is intended to include porous or "foamed" metals.

As shown in FIGURES 1 and 2, a backing material 10 such as the interior wall of a compressor section of a high Mach turbojet engine is provided with a portion of material 12 in FIGURE 1 or a honeycomb structure 15 in FIGURE 2, filled with the new and improved abradable material 12 of the present invention. In FIGURE 1, a compressor blade 16 supported for rotation by conventional means on a rotor wheel 17 is seen to be in operative position with the abradable material 12. During actual operation the blade tip 13 wears or abrades the surface of material 12 away until at operating temperature, when all of the components have expanded to their full size, a desired seal is realized.

Unexpectedly, it was discovered that the combination, by weight, of 3–27.5% boron nitride in admixture with 42–53% sodium silicate aqueous solution (40–42° Baumé) and 3–35% of at least one member selected from the group consisting of vermiculite and mica, when properly blended and heat cured resulted in an abradable material which was especially suitable for use as a seal in the high Mach turbojet engines and which accordingly satisfied the aforesaid objectives of the present invention. In another form, it was discovered that a preferred abradable material could be obtained from the inclusion, in addition of 32–43 weight percent silver.

Although other solid type lubricant materials were available, the inclusion of boron nitride imparted an unexpected high temperature stability to the material along with lower density. This is due to the thermal stability and relatively low weight per volume of boron nitride.

Moreover, it was discovered that exceptionally fine properties of the final end product, which is the subject of the present invention, might be obtained by following specific processing techniques, particularly the order in which the constituents of the new material were combined, and the method of cure which followed the application of the blended mixture to a back up wall.

The new and improved method for producing the abradable seal material of the present invention was discovered to comprise the respective steps of:

(1) Thoroughly dry blending the boron nitride and silver powders, (when silver is included) so as to obtain a uniform powdered mixture;

(2) Slowly adding boron nitride or the silver-boron nitride blend to the sodium silicate solution with continued stirring until the powders are wetted and dispersed throughout the body of the solutions;

(3) Adding mica and/or vermiculite to the solution obtained from (2) above. In the event both mica and vermiculite are added, they are first dry blended, and the powdered blend added to the solution obtained from step (2).

The resultant composition is then applied to the back up wall, either directly, as shown in FIGURE 1, or to the honeycomb structure, as in FIGURE 2, attached to the wall. The thus treated back up material such as a compressor casing assembly is then air dried at room temperature and subsequently cured at about 1000° F. for a period of from 2–5 hours. A preferred heating schedule, however, was found to comprise the following steps:

(1) Heating to 200° F. and maintaining at that temperature for about 1 hour;

(2) Slowly heating at a rate of increase of 100° F./hour to a temperature of 500° F., and maintaining at that temperature for about 1 hour;

(3) Heating to about 1000° F. and maintaining at that temperature for about 5 hours.

The resulting cured material was found to possess excellent adhesion to the metal back up wall at up to temperatures of the order of 1300° F. In addition, the material during operation in a compressor possessed fine abradability characteristics, i.e., was easily machined away by the blade tips, which were found to experience negligible wear as a result of contact with the sealing material. Further, the composition of the present invention was found to exhibit excellent resistance to thermal shock, erosion, extreme variations of environment, shrinkage and deflection. Most importantly, the successful operation of a high Mach turbojet engine having the new and improved abradable seal material of the present invention applied to its compressor walls was not effected in any way.

A preferred formulation of the starting materials used to produce the new and improved abradable seal material of the present invention was found to be as follows (in percent by weight):

COMPOSITION A

| | Percent |
|---|---|
| Silver powder | 35.2 |
| Boron nitride | 4.4 |
| Sodium silicate solution | 44.4 |
| Vermiculite | 16.0 |

The resulting cured composition was stable and capable of use at the high temperatures attained during the operation of high Mach turbojet engines, and further exhibited good thermal shock and erosion resistance, excellent abradability, and resistance to environmental substances such as steam, water and cutting oils.

A second preferred formulation of starting materials used in the production of the new and improved abradable seal material of the present invention consisted of (in percent by weight):

COMPOSITION B

| | Percent |
|---|---|
| Silver powder | 40.0 |
| Boron nitride | 5.0 |
| Sodium silicate solution | 50.0 |
| Mica | 5.0 |

The resulting cured material possessed particularly fine adhesive qualities and was found to bond tenaciously with either the metal of the compressor casing walls, for example, a steel of the 1 Cr, 1 Mo, 0.1 V, balance Fe type or with the honeycomb structure attached thereto within the temperature range of from −100 to +1300° F.

Figure 3:
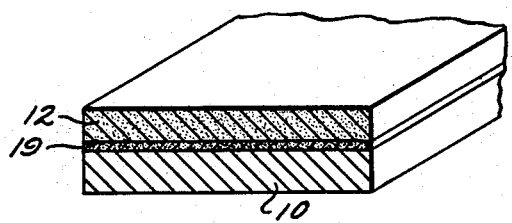
FIGURE 3 is a perspective sectional view of a two portion form of the present invention.

In order to use to the fullest advantage the fine adhesive properties of an abradable seal material obtained by heat treating the formulation of composition B in accordance with the new and improved method of the present invention, as well as the excellent abradability features of the heat cured product obtained from composition A, a thin layer of composition B, shown at 19 in FIGURE 3, may first be applied to the compressor casing wall, and a subsequent layer of composition A, shown at 12 in FIGURE 3 applied over the first thin layer. Thus, composition B can be and, in fact, is preferred to be used as a binder or adhesive primer between the metal wall and the subsequently applied seal material, i.e., composition A. The resultant heat cured composite material possessed in the fine abradability characteristics and the high adhesive properties of the compositions A and B respectively.

In the event it is desired to use a filled honeycomb unit to provide the abradable seal means, a similar technique may be employed, i.e., the honeycomb was first coated with a thin layer of composition B, and thereafter filled with composition A. In an alternate method, the honeycomb was filled by first preforming briquettes of composition A having the same geometrical configuration as the cell structure of the honeycomb to be filled. Before pressing the preformed briquettes into the honeycomb, their lower portions, i.e., those portions of the briquettes contacting the bottom of the honeycomb or compressor casing wall were coated with a thin layer of composition B. After a heat treatment rendered in accordance with the method of the present invention, an abradable seal having an exceptionally fine adhesive quality as well as excellent abradability characteristics was realized.

As previously stated, the new and improved abradable seal material of the present invention can easily be repaired or "patched" in situ after it has been subjected to an operating rub at the high temperatures attained during the operation of a high Mach turbojet engine. A formulation which was found to be preferred in "patching" damaged sections of the abradable coating consisted of (in percent by weight):

COMPOSITION C

| | Percent |
|---|---|
| Silver powder | 35.50 |
| Boron nitride | 4.45 |
| Sodium silicate solution | 44.50 |
| Mica | 4.45 |
| Vermiculite | 11.10 |

Before the patch material was applied to the damaged seal surface, it is preferred that the surface be clean, and prepared for the patch coating. This cleaning was easily accomplished by applying a rotary hand drill provided with a metal-milling file directly to the damaged areas. When the damaged area is oily and grimy, however, it is preferable to first heat cure the surface at a temperature of about 800° F. for about 1 hour before preparing the surface for patching.

The patch material, such as composition C for example, was then applied by hand, as with a spatula and subsequently was smoothed off and heat cured. The resulting patch assembly was found to function in the same manner and to possess the same fine characteristics during high Mach turbojet engine operation as did the original unpatched abradable material of the present invention.

In order that those skilled in the art can better understand how the new and improved abradable material of the present invention can be obtained, the following examples are given by way of illustration and not by way of limitation. All parts and percentages are by weight unless otherwise noted.

*Example 1*

5 parts of −325 mesh boron nitride powder having a specific gravity of 0.12–0.14 were added to 40 parts of −325 mesh silver powder and the mixture dry blended until there was a thorough dispersion of the boron nitride in the silver. The resulting mixture was slowly added to 50 parts of an aqueous sodium silicate solution (40–42° Baumé) while the solution was stirred, and stirring was continued until the added powders were thoroughly wetted and dispersed into a smooth mixture. Thereupon, 5 parts of −325 mesh powdered mica (synthetic fluorophlogopite) were added to the mixture, and the stirring continued until a smooth homogeneous slurry was obtained. Thus the mixture contained, by weight, 5% boron nitride, 40% silver, 50% sodium silicate and 5% mica.

A thin coating of this mixture, approximately 0.05 inch thick, was applied to the interior walls of a compressor casing of a high Mach turbojet engine and the coated assembly was permitted to air dry for about 12 hours. Thereafter, the assembly was heated to 200° F. and maintained at that temperature for about 1 hour. The temperature of the assembly was then increased at a rate of 100° F. per hour until a temperature of 500° F. was reached and this temperature was maintained for about 1 hour. The temperature of the assembly was thereafter raised to 1000° F. and the assembly maintained at that temperature for about 5 hours. The resulting cured material was found to have a density of about 0.035 lb. per cubic inch and exhibited excellent adhesion with the metal of the compressor casing.

*Example 2*

A honeycomb assembly of an alloy consisting of, by weight nominally, 15% Cr, 2% Ti, 7% Fe and the balance Ni, was secured to the interior wall of the compressor casing of a high Mach turbojet engine and was examined to make certain it was free of scale and oxides. The assembly was vapor degreased and, subsequently, thoroughly dried. The honeycomb structure used in the present case contained square shaped cells having a size of approximately ¼ inch and a cell wall thickness of about 0.002 inch. The cell walls were additionally provided with small notches at the bottom of each cell so as to provide an interconnection between adjacent cells which assisted in the filling operation and prevented air entrapment in the bottom of the filled cells.

By the method of Example 1, 4.4% of boron nitride, 35.2% of silver powder, 44.4% of aqueous sodium silicate solution and 16% of vermiculite were blended to form a smooth homogeneous slurry.

The honeycomb was then filled with the smooth homogeneous slurry, and the resultant assembly heat treated in accordance with the method described in Example 1. The resulting heat cured composition had a density of approximately 0.035 lb. per cubic inch and possessed excellent abaradibility, good thermal shock, erosion resistance, and resistance to environmental substances such as steam, water and cutting oils, and was successfully used as a compressor seal in a high Mach turbojet engine operating at temperatures of the order of 1300° F.

*Example 3*

Example 2 above was repeated with a homogeneous slurry consisting of 27.5% boron nitride, 50% sodium silicate aqueous solution (40–42° Baumé) and 22.5% mica blended by the method of Example 1. Engine test results proved the material to have the same fine qualities as in the previous examples with the additional capability of use in higher temperature operating apparatus due to the elimination of silver. It had been found that, for the higher temperature operating engines, portions of the material including silver, after being abraded away, were carried by the air stream to the hotter portions of the engines where the silver became molten. Thus, some of the engine parts were coated with silver which interfered with their operation.

*Example 4*

Example 2 above was repeated with a hmogeneous slurry consisting of 15% boron nitride, 50% sodium silicate aqueous solution (40–42° Baumé) and 35% mica, blended by the method of Example 1. Engine test results again proved the material to have the same fine qualities with the additional capability for use in higher temperature apparatus due to the exclusion of silver. However, when coatings of silver are not undesirable and, in fact, may in some cases be desirable, the materials of Examples 3 and 4 can be modified to include silver according to the present invention.

*Example 5*

A honeycomb structure of the type described in Example 2 was thoroughly cleaned and a thin layer, approximately 0.015 inch thick, of the homogeneous slurry prepared in accordance with Example 1 was applied thereto. Thereafter, the smooth homogeneous slurry prepared in accordance with Example 2 was used to completely fill the honeycomb assembly, and the resulting filled assembly heat treated in accordance with the method of Example 1. The cured assembly was water soaked for three days, and rapidly frozen by four-hour aging at −100° F. The frozen assembly was then placed in a 1300° F. oven for two hours, and subsequently quenched in cold water. The only effect noted was a slight darkening of color. Adhesion to the metal, as well as the abradability of the filled structure remained unchanged, and shrinkage was negligible.

*Example 6*

In accordance with the method of Example 1, 4.45% boron nitride, 35.5% silver powder, 44.5% sodium silicate solution (40–42° Baumé), 4.45% mica and 11.10% vermiculite were blended to form a smooth homogeneous slurry. In the present case, the mica and vermiculite powders were thoroughly dry blended prior to being introduced into the sodium silicate-boron nitride-silver mixture. A compressor casing assembly having a honeycomb structure secured thereto, which was filled in accordance with Example 5, and which had been subjected to actual turbojet engine operation was removed from a high Mach turbojet engine. The assembly was first heat cured at a temperature of about 800° F. to insure removal of any oil and grime which may have accumulated during engine operation. Thereafter, a rotary hand drill provided with a metal milling file was applied to the damaged portions to further clean and repair the area for the patch material to be subsequently applied. A thin layer of the homogeneous slurry (0.015 inch thick) prepared in accordance with Example 1 was then applied to the damaged area, and the mixture prepared as per the present example was then carefully applied over the damaged areas. The resultant filled material was smoothed off and cured in accordance with the method of Example 1. The cured product, exhibiting a density of about 0.046 lb. per cubic inch was found to bond tenaciously with the previously applied abradable material, exhibited fine abradability, excellent thermal shock and erosion resistance, and functioned in an entirely successful manner under actual turbojet engine operating conditions.

It should be noted that various types of mica can be employed in the practice of the present invention. Among the varieties of mica which can be successfully used in the formulations of the new and improved abradable material of the present invention are muscovite, biotite, phlogopite, lepidolite, sycicite, paragonite, lepidomelane, zinnwualdite, roscoelite, as well as synthetic mica or fluorophlogopite.

Although the use of −325 mesh silver, boron nitride and mica powders has been suggested, it should be understood that the particle size of the powders used in the production of the new and improved abradable material of the present invention can be varied within wide limits without departing from the true spirit and scope of the present invention.

Moreover, the density of the heat cured abradable material can also be varied widely without a departure from the spirit of the invention. However, densities having values of less than 0.50 lb. per cubic inch, and preferably of the order of 0.30–0.47 lb. per cubic inch are recommended.

It is to be understood that the present invention is not to be considered limited to any of the specific embodiments herein illustrated and described, but can be used in other ways without departure from the spirit of the invention and scope of the appended claims.

What is claimed is:

1. An abradable material capable of use in elevated temperature operating apparatus consisting of a heat cured mixture consisting essentially of, by weight, 3–27% boron nitride, 42–53% aqueous sodium silicate solution (40–42° Baumé), and 3–35% of at least one member selected from the group consisting of mica and vermiculite.

2. An abradable material capable of use in elevated temperature operating apparatus consisting of a heat cured mixture consisting essentially of, by weight, 3–6% boron nitride, 42–53% aqueous sodium silicate solution (40–42° Baumé), 32–43% silver, and 3–35% of at least one member selected from the group consisting of mica and vermiculite.

3. An abradable material capable of use in elevated temperature operating apparatus consisting of a heat cured mixture consisting essentially of, by weight, 3–6% boron nitride, 42–53% aqueous sodium silicate solution (40–42° Baumé), and at least one member selected from the group consisting of mica and vermiculite used in the respective portions of 3–6% mica and 10–17% vermiculite.

4. An abradable material capable of use in elevated temperature operating apparatus consisting of a heat cured mixture consisting essentially of, by weight, 4–5% boron nitride, 44–50% aqueous sodium silicate solution (40–42° Baumé), 35–40% silver, and at least one member selected from the group consisting of mica and vermiculite used in the respective portions of 4–5% mica and 11–15% vermiculite.

5. An abradable material capable of used in elevated temperautre operating apparatus consisting of a heat cured mixture consisting essentially of, by weight, 15–27.5% boron nitride, 50% aqueous sodium silicate solution (40–42° Baumé), and 22.5–35% mica.

6. A method of producing an abradable seal material for use as an inner casing surface lining in a compressor having a rotor with a plurality of circumferentially disposed, radially extending blades, said method comprising adding 3–27 weight percent boron nitride powder to 43–53 weight percent of an aqueous sodium silicate solution (40–42° Baumé), stirring continuously until the powders are wetted and dispersed throughout the body of the solution, adding 3–35 weight percent of at least one member selected from the group consisting of mica and vermiculite, stirring continuously until a homogeneous mixture is obtained, applying the resulting mixture to line the said inner surface of the said casing, and heat curing the coated assembly at 1000° F. for a period of from about 2–5 hours.

7. The method of claim 6 in which the heat curing comprises the respective steps of: (1) heating the coated assembly at 200° F. for about 1 hour, (2) increasing the temperature of the coated assembly at a rate of 100° F. per hour until the temperature of said coated assembly reaches 500° F., (3) heating at 500° F. for about 1 hour, and (4) heating at 1000° F. for about 5 hours.

8. The method of producing an abradable seal material for use as an inner casing surface lining in a compressor having a rotor with a plurality of circumferentially disposed, radially extending blades, said method comprising dry blending, by weight, 32–43% silver powder with 3–6% boron nitride, adding the silver-boron nitride mixture to 42–53% of an aqueous sodium silicate solution (40–42° Baumé), stirring continuously until the powders are wetted and dispersed throughout the body of the solution, adding 3–35% of at least one member selected from the group consisting of mica and vermiculite, stirring continuously until a homogeneous mixture is obtained, applying the resulting mixture to line the said inner surface of the said casing, and heat curing the coated assembly at 1000° F. for a period of from about 2–5 hours.

9. The method of claim 8 where the materials are used in the proportions of, in percent by weight, 35.2% silver, 4.4% boron nitride, 44.4% aqueous sodium silicate solution (40–42° Baumé) and 16% vermiculite.

10. The method of claim 8 where the materials are used in the proportions of, in percent by weight, 40% silver, 5% boron nitride, 50% aqueous sodium silicate solution (40–42° Baumé) and 5% mica.

11. The method of claim 8 where the materials are used in the proportions of, in percent by weight, 35.5% silver, 4.45% boron nitride, 44.5% aqueous sodium silicate solution (40–42° Baumé), 4.45% mica and 11.10% vermiculite.

References Cited in the file of this patent

UNITED STATES PATENTS

| | | |
|---|---|---|
| 255,541 | Senter | Mar. 28, 1882 |
| 464,367 | Kimble | Dec. 1, 1891 |
| 899,319 | Parsons et al. | Sept. 22, 1908 |
| 953,674 | Westinghouse | Mar. 29, 1910 |
| 1,033,237 | Ferranti | July 23, 1912 |
| 1,159,094 | Rice | Nov. 2, 1915 |
| 1,693,015 | Babor et al. | Nov. 27, 1928 |
| 1,707,277 | Kline | Apr. 2, 1929 |
| 1,919,372 | Kliefoth | July 25, 1933 |
| 1,941,990 | Lindstrom | Jan. 1, 1934 |
| 2,117,605 | Fowler | May 17, 1938 |
| 2,125,286 | Fletcher | Aug. 2, 1938 |
| 2,201,717 | Dawihl et al. | May 21, 1940 |
| 2,209,304 | Alder | July 30, 1940 |
| 2,268,869 | Given | Jan. 6, 1942 |
| 2,328,644 | Happe | Sept. 7, 1943 |
| 2,393,116 | McCulloch et al. | Jan. 15, 1946 |
| 2,409,514 | Pratt | Oct. 15, 1946 |
| 2,440,969 | Nightingall | Apr. 4, 1948 |
| 2,479,914 | Drugmand | Aug. 8, 1949 |
| 2,492,935 | McCulloch et al. | Dec. 27, 1949 |
| 2,694,647 | Cole | Nov. 16, 1954 |
| 2,720,356 | Erwin | Oct. 11, 1955 |
| 2,754,050 | Wellington | July 10, 1956 |
| 2,756,159 | Kendall et al. | July 24, 1956 |
| 2,839,413 | Taylor | June 17, 1958 |
| 2,840,343 | Brandt et al. | June 24, 1958 |
| 2,887,393 | Taylor | May 19, 1959 |
| 2,930,521 | Koehring | Mar. 29, 1960 |
| 2,963,307 | Bobo | Dec. 6, 1960 |

FOREIGN PATENTS

| | | |
|---|---|---|
| 1,145,388 | France | May 6, 1957 |
| 791,568 | Great Britain | Mar. 3, 1958 |

OTHER REFERENCES

Bureau of Mines Report 5337, "Synthetic Mica Investigations IX," June 1957, page 2.